(12) United States Patent
Stahl et al.

(10) Patent No.: US 7,811,668 B2
(45) Date of Patent: Oct. 12, 2010

(54) EPOXY RESIN WITH INCREASED FLEXURAL IMPACT STRENGTH AND BREAKING EXTENSION

(75) Inventors: Rainer Stahl, Arnsberg (DE); Won Jai Park, Goettingen (DE); Ferdinand Hardinghaus, Bad Honnef (DE); Christopher David Glende, Goettingen (DE); Karl Koehler, Diekholzen (DE)

(73) Assignee: Solvay Infra Bad Hoenningen GmbH, Hannover (DE)

( * ) Notice: Subject to any disclaimer, the term of this patent is extended or adjusted under 35 U.S.C. 154(b) by 840 days.

(21) Appl. No.: 10/581,684

(22) PCT Filed: Dec. 1, 2004

(86) PCT No.: PCT/EP2004/013613

§ 371 (c)(1),
(2), (4) Date: Apr. 23, 2007

(87) PCT Pub. No.: WO2005/054357

PCT Pub. Date: Jun. 16, 2005

(65) Prior Publication Data

US 2007/0232725 A1 Oct. 4, 2007

(30) Foreign Application Priority Data

Dec. 6, 2003 (DE) ............................. 103 57 115

(51) Int. Cl.
  B32B 27/04 (2006.01)
  B32B 27/20 (2006.01)
  B32B 27/38 (2006.01)
  C08L 63/00 (2006.01)
  C08K 3/10 (2006.01)
  C08K 3/30 (2006.01)

(52) U.S. Cl. .................. 428/413; 428/297.4; 428/323; 428/328; 428/332; 523/440; 523/442; 523/457; 523/459

(58) Field of Classification Search ............... None
  See application file for complete search history.

(56) References Cited

U.S. PATENT DOCUMENTS

| | | | |
|---|---|---|---|
| 5,008,309 A | 4/1991 | Ibe et al. | |
| 5,312,604 A | 5/1994 | Jaeger et al. | |
| 5,976,699 A * | 11/1999 | Hosomi et al. | ............. 428/418 |
| 2003/0064228 A1 | 4/2003 | Oosedo et al. | |
| 2003/0124048 A1 | 7/2003 | Hardinghaus et al. | |
| 2005/0048877 A1 | 3/2005 | Koehler et al. | |
| 2007/0140938 A1 | 6/2007 | Stahl et al. | |
| 2007/0167535 A1* | 7/2007 | Poppe et al. | .................. 522/71 |
| 2007/0254982 A1 | 11/2007 | Koehler et al. | |
| 2008/0190325 A1 | 8/2008 | Koehler et al. | |
| 2008/0312362 A1 | 12/2008 | Glende et al. | |
| 2009/0163638 A1 | 6/2009 | Hardingghaus et al. | |

FOREIGN PATENT DOCUMENTS

| | | |
|---|---|---|
| DE | 33 47 191 | 6/1984 |
| DE | 37 18 277 | 12/1988 |
| EP | 0 094 087 | 11/1983 |
| EP | 0 406 657 | 1/1991 |
| GB | 936 057 | 9/1963 |
| JP | 57 51119 | 3/1982 |

OTHER PUBLICATIONS

U.S. Appl. No. 11/916,394, filed Dec. 3, 2007, Koehler, et al.
Batzer et al., "Epoxidverbindungen", Ullmanns Enzyklopaedia Der Technischen Chemie, 4ed., vol. 10, pp. 563-580.
Sienel et al., "Epoxides", Ullmann's Encyclopedia of Industrial Chemistry, 5 ed., vol. 9, pp. 531-563.
Kirk-Othmer, "Composite Materials", Encyclopedia of Chemical Technology, 4 ed., vol. 7, pp. 1-40 1993.
Kirk-Othmer, "Epoxy Resins", Encyclopedia of Chemical Technology, 4 ed., vol. 9, pp. 730-755, 1994.
Bittmann, "Viel Wind Um GFK", Kunststoffe, vol. 11, pp. 119-124, 2002.

* cited by examiner

*Primary Examiner*—Michael J Feely
(74) *Attorney, Agent, or Firm*—Oblon, Spivak, McClelland, Maier & Neustadt, L.L.P.

(57) ABSTRACT

Epoxy resins comprising deagglomerated barium sulphate with an average particle size of less than 0.5 μM feature increased flexural impact strength and breaking extension. Epoxy resins of this kind can be used as, for example, composite material or binders in watercraft construction, in wind turbines, in pipes, for containers or in aircraft construction, in particular in composite materials comprising glass fibre or carbon fibre.

20 Claims, No Drawings

EPOXY RESIN WITH INCREASED FLEXURAL IMPACT STRENGTH AND BREAKING EXTENSION

This application is a 371 of PCT/EP04/13613, filed Dec. 1, 2004.

The invention relates to an epoxy resin having increased flexural impact strength and breaking extension, to corresponding composite material, to a composition of epoxy resin precursor (preferably hardener or resin) and barium sulphate, to a process for producing the epoxy resin and to the use of the composite material for various purposes.

Epoxy resins are organic compounds, generally oligomeric, having more than one epoxide group per molecule. These oligomeric compounds can, using suitable hardeners, be converted into thermosets. Epoxy resins are used as, for example, casting resins or else as laminates (in aircraft, vehicle or watercraft construction, for example).

Monoepoxide compounds used as starting material for producing epoxy resins are, in particular, epichlorohydrin, but also glycidol, styrene oxide, cyclohexene oxide, and glycidol acrylate and methacrylate. Resin is formed by reaction, especially with bisphenol A. For specific resins, other polyols, such as aliphatic glycols, are also suitable. Liquid resins may also be chain-extended by the "advancement" method. Examples of suitable curing agents include dicarboxylic anhydrides or amine hardeners. An elucidation of principles is found for example in Ullmanns Enzyklopädie der Technischen Chemie, 4th edition, volume 10, pages 563-580 and in Kirk-Othmer, Encyclopedia of Chemical Technology, 4th edition, volume 9, pages 730-755.

One of the uses of epoxy resin is for composite materials. These composite materials are constructed from matrix material and reinforcements. The matrix material used is predominantly epoxy resins. Reinforcement material is preferably fibrous; preferred materials are glass fibre, carbon fibre and aramid fibre. Fundamental information on these is found in Kirk-Othmer, Encyclopedia of Chemical Technology, 4th edition, volume 7, pages 1-40. Composite materials with an epoxy matrix can be used in, for example, aircraft construction, spaceship construction, for satellites, vehicles, in railway construction, in watercraft construction, for architectural components, flywheels, and pressure vessels; see, for example, published US patent application 2003/0064228 A1 and EP-A-1 094 087. Another field of application is that of rotors for wind turbines; see Kunststoffe 11 (2002), pages 119-124.

The invention is based on the finding that deagglomerated barium sulphate endows cured epoxy resins with increased flexural impact strength and breaking strength.

The present invention accordingly provides a cured epoxy resin having increased flexural impact strength and breaking strength that comprises deagglomerated barium sulphate comprising a crystallization inhibitor and a dispersant and having an average (primary) particle size <0.5 µm. This effect was unforeseeable. Other fillers, or even barium sulphate which has not been deagglomerated, lead to reduced flexural impact strength and breaking extension.

Preferred deagglomerated barium sulphate has an average (primary) particle size of <0.1 µm, in particular <0.08 µm (i.e. 80 nm), with very particular preference <0.05 µm (i.e. 50 nm), more preferably still <0.03 µm (i.e. 30 nm). Outstanding particles are those with sizes <20 µm, especially those with an average primary particle size of <10 nm. The average particle sizes in question are those determined by XRD or laser diffraction methods. A preferred barium sulphate is obtainable by precipitating barium sulphate in the presence of a crystallization inhibitor in the presence of a dispersant and/or by deagglomerating the barium sulphate following precipitation in the presence of a dispersant.

The amount of crystallization inhibitor and dispersant in the deagglomerated barium sulphate is flexible. Per part by weight of barium sulphate it is possible for there to be up to 2 parts by weight, preferably up to 1 part by weight, each of crystallization inhibitor and dispersant. Crystallization inhibitor and dispersant are present preferably in an amount of 1% to 50% by weight each in the deagglomerated barium sulphate. The amount of the barium sulphate present is preferably from 20% to 80% by weight.

It is known that in the course of its conventional preparation barium sulphate forms agglomerates ("secondary particles") made up of primary particles. The term "deagglomerated" in this context does not mean that the secondary particles have been broken down completely into primary particles which exist in isolation. It means that the secondary barium sulphate particles are not in the same agglomerated state in which they are typically produced in precipitations, but instead are in the form of smaller agglomerates. The deagglomerated barium sulphate for use in the epoxy resin of the invention preferably contains agglomerates (secondary particles) at least 90% of which have a particle size of less than 2 µm, preferably less than 1 µm. With particular preference at least 90% of the secondary particles are smaller than 250 nm, with very particular preference smaller than 200 nm. More preferably still at least 90% of the secondary particles are smaller than 130 nm, with particular preference smaller than 100 nm, with very particular preference smaller than 80 nm; more preferably still 90% of the secondary particles have a size of <50 nm. In part or even in substantial entirety the barium sulphate is in the form of unagglomerated primary particles. The average particle sizes in question are those determined by XRD or laser diffraction methods.

Preferred crystallization inhibitors have at least one anionic group. The anionic group of the crystallization inhibitor is preferably at least one sulphate, at least one sulphonate, at least two phosphate, at least two phosphonate or at least two carboxylate group(s).

Crystallization inhibitors present may be, for example, substances that are known to be used for this purpose, examples being relatively short-chain polyacrylates, typically in the form of a sodium salt; polyethers such as polyglycol ethers; ether sulphonates such as lauryl ether sulphonate in the form of the sodium salt; esters of phthalic acid and of its derivatives; esters of polyglycerol; amines such as triethanolamine; and esters of fatty acids, such as stearic esters, as specified in WO 01/92157.

As crystallization inhibitor it is also possible to use a compound or a salt of the formula (I) having a carbon chain R and n substituents [A(O)OH] in which R is an organic radical which has hydrophobic and/or hydrophilic moieties, R being a low molecular mass, oligomeric or polymeric, optionally branched and/or cyclic carbon chain which optionally contains oxygen, nitrogen, phosphorus or sulphur heteratoms, and/or being substituted by radicals which are attached via oxygen, nitrogen, phosphorus or sulphur to the radical R, and A being C, P(OH), OP(OH), S(O) or OS(O), and n being 1 to 10 000.

In the case of monomeric or oligomeric compounds, n is preferably 1 to 5.

Useful crystallization inhibitors of this kind include hydroxy-substituted carboxylic acid compounds. Highly useful examples include hydroxy-substituted monocarboxylic and dicarboxylic acids having 1 to 20 carbon atoms in the chain (reckoned without the carbon atoms of the COO groups), such as citric acid, maleic acid (2-hydroxybutane-1, 4-dioic acid), dihydroxysuccinic acid and 2-hydroxyoleic acid, for example.

Also very useful are phosphonic acid compounds having an alkyl (or alkylene) radical with a chain length of 1 to 10 carbon atoms. Useful compounds in this context are those having one, two or more phosphonic acid radicals. They may additionally be substituted by hydroxyl groups. Highly useful examples include 1-hydroxyethylenediphosphonic acid, 1,1-diphosphonopropane-2,3-dicarboxylic acid and 2-phosphonobutane-1,2,4-tricarboxylic acid. These examples show that compounds having not only phosphonic acid radicals but also carboxylic acid radicals are likewise useful.

Also very useful are compounds which contain 1 to 5 or an even greater number of nitrogen atoms and also 1 or more, for example up to 5, carboxylic acid or phosphonic acid radicals and which are optionally substituted additionally by hydroxyl groups. These compounds include, for example, those having an ethylenediamine or diethylenetriamine framework and carboxylic acid or phosphonic substituents. Examples of highly useful compounds include diethylenetriamine pentakis(methanephosphonic acid), iminodisuccinic acid, diethylenetriaminepentacetic acid and N-(2-hydroxyethyl)ethylenediamine-N,N,N-triacetic acid.

Also very useful are polyamino acids, an example being polyasparatic acid.

Also very useful are sulphur-substituted carboxylic acids having 1 to 20 carbon atoms (reckoned without the carbon atoms of the COO group) and one or more carboxylic acid radicals, an example being sulphosuccinic acid bis-2-ethylhexyl ester (dioctylsulphosuccinate).

It is of course also possible to use mixtures of the additives, including mixtures, for example, with further additives such as phosphorous acid.

Very particular preference is given to citric acid and sodium polyacrylate, such as Dispex®N40, as crystallization inhibitor.

The preparation of the above-described barium sulphate intermediate with the crystallization inhibitors of the formula (I) is advantageously carried out by precipitating the barium sulphate in the presence of the envisaged crystallization inhibitor. It can be advantageous if at least part of the inhibitor is deprotonated; for example, by using the inhibitor at least in part, or in entirely, as an alkali metal salt, a sodium salt for example, or as an ammonium salt. Naturally it is also possible to use the acid and to add a corresponding amount of the base, or in the form of an alkali metal hydroxide solution.

The deagglomerated barium sulphate comprises not only the crystallization inhibitor but also an agent which has a dispersing action. This dispersant can be added during the actual precipitation or in a deagglomeration stage subsequent to the precipitation. The dispersant prevents reagglomeration.

The dispersant preferably has one or more anionic groups which are able to interact with the surface of the barium sulphate. Preferred groups are the carboxylate group, the phosphate group, the phosphonate group, the bisphosphonate group, the sulphate group and the sulphonate group. The dispersant contains groups for coupling to or into the epoxy resin. These are typically groups which bring about this coupling chemically, examples being OH groups or NH groups or $NH_2$ groups. Preferably there are polyether groups present which are substituted terminally by hydroxyl groups. As a result of this substitution the barium sulphate particles are externally hydrophilicized. Barium sulphate of this kind, of the invention, exhibits no tendency to reagglomerate. In the course of the application there may even be further deagglomeration. Especially good properties are exhibited by a barium sulphate coated with a dispersant which contains a multiplicity of carboxylate groups and a multiplicity of hydroxyl groups and also has further substituents which are stearically bulky, examples being polyether groups. A very preferred group of dispersants are polyether polycarboxylates substituted terminally on the polyether groups by hydroxyl groups, examples being those supplied under the name Melpers® of the company SKW.

There are a number of variants for making the deagglomerated barium sulphate available.

The first variant envisages precipitating barium sulphate in the presence of a crystallization inhibitor and then carrying out a deagglomeration. This deagglomeration is carried out in the presence of one of the abovementioned dispersants.

The second variant envisages precipitating barium sulphate in the presence of a crystallization inhibitor and one of the above-mentioned dispersants.

The first variant is now elucidated in more detail.

Barium sulphate is precipitated by typical methods, such as by reacting barium chloride or barium hydroxide with alkali metal sulphate or sulphuric acid. In the course of this precipitation, methods are employed in which primary particles are formed with the fineness indicated above. In the course of the precipitation, additives are employed which inhibit crystallization, examples being those as specified in WO 01/92157, or the aforementioned compounds of the formula (I) which have a crystallization inhibitor effect. The precipitated barium sulphate is dewatered, if desired, to the paste state or even to the state of a dry powder. This is followed by wet deagglomeration. The liquid chosen may be water or an organic liquid, an alcohol for example. The deagglomeration, which is carried out for example in a bead mill, then takes place in the presence of a dispersant. The dispersants have been specified above. The grinding and hence the deagglomeration are carried out until the desired degree of deagglomeration has been reached. The deagglomeration is preferably carried out until the deagglomerated barium sulphate of the invention has secondary particles of which 90% are smaller than 2 µm, preferably smaller than 1 µm, with particular preference smaller than 250 nm, with very particular preference smaller than 200 nm. With even greater preference deagglomeration is carried out until 90% of the secondary particles are smaller than 130 nm, with particular preference smaller than 100 nm, with very particular preference smaller than 80 nm, more preferably still <50 nm. The barium sulphate in this case may in part or even in substantial entirety be present in the form of unagglomerated primary particle sizes (average particle sizes, determined by XRD or laser diffraction methods). The suspension of deagglomerated barium sulphate, comprising a crystallization inhibitor and a dispersant, that is formed in the course of the wet deagglomeration can then be used as it is. It is also possible to produce a storage-stable suspension by addition of acid, examples being acetic acid or higher homologues such as propionic acid.

Another possibility is to carry out a drying operation, by spray drying for example. The particles formed in such an operation break down again very readily into the deagglomerated barium sulphate. The barium sulphate of the invention is formed of very small primary particles, the secondary particles are in a deagglomerated state, and it is redispersible.

The second variant for the production of deagglomerated barium sulphate envisages carrying out the precipitation, for example by reacting barium chloride or barium hydroxide with alkali metal sulphate or sulphuric acid, in the presence of a crystallization inhibitor and a dispersant; this procedure leads to the formation of readily dispersible deagglomerated barium sulphate during the actual precipitation. Dispersants of this kind, which endow the barium sulphate particles with a surface which prevents reagglomeration and inhibits agglomeration during the precipitation electrostatically, stearically, or both electrostatically and stearically, have been elucidated earlier on above. This embodiment produces a barium sulphate deagglomerated within the meaning of the invention as early as during the precipitation stage.

The thus-precipitated barium sulphate, comprising crystallization inhibitor and dispersant, is ready to use, in principle, and can be employed as an aqueous suspension; as described above, stabilization of the suspension with acid is possible. The precipitated barium sulphate can also be partly or wholly dewatered, by means of spray drying, for example. The product then is a paste or a powder. The powder, of course, contains agglomerates. These agglomerates, however, are not of the same nature as in prior-art barium sulphate, but instead are relatively loose agglomerates which are redispersible in liquid media to form deagglomerated particles again. Alternatively the powder can be converted into a suspension with the addition of water or organic liquids; in this case as well the deagglomerated particles as were present prior to drying are obtained again. In certain applications there is no need to comminute the dried aggregates or convert them into a suspension prior to application, since they undergo transformation into the deagglomerated particles in the course of the application—for example, when they are incorporated into liquid precursor products. Often, indeed, a further deagglomeration is observed.

The deagglomerated barium sulphate preferably has a particle size (primary particles) in the range from 0.01 to 0.5 μm, very particularly 0.01 to 0.1 μm, for example from 0.01 μm to 0.08 μm. This barium sulphate is present preferably in an amount of 1% to 50% by weight, preferably 1% to 25% by weight, in the cured epoxy resin.

An especially preferred cured epoxy resin in accordance with the present invention is obtainable by dispersing the barium sulphate in a precursor of the cured epoxy resin, preferably in the hardener and/or in the resin (to which hardener has not yet been added; i.e., resin which is as yet uncured). This can be done using, for example, high-speed stirrers.

Epoxy resins cured with very particular preference are those obtainable by dispersing the barium sulphate in a precursor of the cured epoxy resin, preferably in the hardener or in the as yet uncured resin. In this case the barium sulphate exhibits particularly good and durable deagglomeration.

Epoxides which are highly suitable are those based on bisphenol A and epichlorohydrin. They may also include admixtures, examples being reaction products of bisphenol F and epichlorohydrin or glycidyl ethers, 1,6-hexanediol diglycidyl ether for example. Very useful epoxides are those with 50% to 100% by weight of bisphenol A/epichlorohydrin, 0% to 50% by weight, preferably 10% to 25% by weight, of bisphenol F/epichlorohydrin, and 0% to 50% by weight, preferably 10% to 25% by weight, of 1,6-hexanediol glycidyl ether. One commercial product with such a composition is Epilox M730® resin.

Examples of highly suitable hardeners include those based on polyoxyalkylenamines. It is also possible to employ mixtures, examples being mixtures of the polyoxyalkyleneamines with cyclohexanediamines or piperazinylethylamines. A very useful hardener, for example, is one with 50% to 100% of polyoxyalkyleneamine, 0% to 50% by weight, preferably 10% to 25% by weight, of 1,2-cyclohexanediamine (also as an isomer mixture), and 0% to 50% by weight, preferably 10% to 25% by weight, of 2-piperazin-1-ylethylamine. One commercial product with such a composition is Epilox M888®.

The cured epoxy resins of the invention may comprise further typical constituents such as, for example, curing accelerators or pigments.

The invention further provides a process for producing the epoxy resins of the invention. It envisages deagglomerating barium sulphate having a primary particle size <0.1 μm (for preferred particle sizes see above) in a precursor of the cured epoxy resin. The deagglomeration of the barium sulphate is carried out preferably in the hardener, in the epoxy resin before it has been mixed with hardener, or in both. Mixing of the starting materials, at least one of which contains the deagglomerated, dispersed barium sulphate, such as mixing of resin and hardener, or mixing of the component containing barium sulphate with resin or hardener not containing barium sulphate, produces cured epoxy resin.

The invention additionally provides a composite material which comprises the cured epoxy resin of the invention. The composites in question may be, for example, composites which comprise fibres such as glass fibre, carbon fibre or aramid fibre in the matrix. They may also be laminates, where fibres or a woven fabric are added in a polymer matrix in individual layers.

The composites are produced by known methods, such as by wet lamination, by infusion or by way of prepregs.

The invention additionally provides the composition comprising epoxy resin precursor, preferably hardener and deagglomerated barium sulphate, having a primary particle size <0.1 μm, and optionally dispersant. The amount of barium sulphate in this composition is preferably 0.1% to 50% by weight.

Further provided by the invention is a composition comprising hardener-free epoxy resin and deagglomerated barium sulphate having a particle size <0.1 μm. Preferred particle sizes of the barium sulphate have been indicated earlier on above. The amount of barium sulphate in this composition is preferably 0.1% to 50% by weight.

The composite material of the invention can be used as a construction material, for example in watercraft construction, in wind turbines, for pipe construction, for containers, in aircraft construction and in vehicle construction.

The composite material has the advantage that the flexural impact strength and breaking extension are enhanced in a desirable way, a factor which is particularly advantageous in the case of laminates, since the risk of delamination is reduced.

The examples which follow are intended to illustrate the invention without restricting it in its scope.

EXAMPLES

Example 1

Preparation of Chemically Dispersed Barium Sulphate by Precipitation in the presence of crystallization inhibitors and subsequent grinding in the presence of polymeric dispersants.

1.1. Preparation with Citric Acid as Crystallization Inhibitor

Starting materials used were barium chloride and sodium sulphate. Barium chloride solution and sodium sulphate solution were reacted in the presence of citric acid as crystallization inhibitor, with precipitation of barium sulphate. The precipitated barium sulphate was dried and suspended in isopropanol, a polyether polycarboxylate substituted terminally on the polyether groups by hydroxyl groups (Melpers®0030) was added as dispersant, and the dispersed sulphate was deagglomerated in a bead mill. The isopropanol was removed by evaporation. The barium sulphate contained about 7.5% by weight of citric acid and about 25% by weight of the polyether carboxylate.

1.2. Preparation Using Other Starting Compounds and a Different Crystallization Inhibitor Example 1.1. was repeated. Barium chloride was replaced by barium hydroxide solution and sodium sulphate by sulphuric acid. Instead of citric acid 3% by weight of Dispex® N40 (a sodium polyacrylate) was used. Melpers®0030 was used in an amount of 8.5% by weight.

Example 2

Preparation of the Premix Containing the Deagglomerated Barium sulphate in chemically dispersed form.

The deagglomerated barium sulphate prepared according to Example 1.2 was suspended in the hardener. During this procedure, deagglomeration was observed.

General Remarks Relating to the Production of the Epoxy Resin:

The epoxy resin used was Epilox M730® from Leuna-Harze GmbH. The hardener used was Epilox M888®, likewise from Leuna-Harze GmbH.

In all of the experiments the cured epoxy resin was composed of 100 parts by weight of Epilox M730®, 24 parts by weight of Epilox M880® and 31 parts by weight of filler (including crystallization inhibitor and dispersant when the barium sulphate prepared according to Example 1 was used).

The filler was dispersed in the resin or in the hardener. The filler of the invention used was the premix prepared in accordance with Example 2, comprising barium sulphate and hardener.

Test sheets were produced for determination of the properties, the procedure being as follows:

Where a filler/hardener or filler/resin (dispersant) mixture was used, it was prepared beforehand as follows:
1. The filler, the filler/hardener (dispersant) mixture or the filler/resin (dispersant) mixture was weighed out into a dispersing vessel. The dispersing vessel is a vacuum dissolver having a mechanical stirrer with a very high rotational speed.
2. The dissolver vessel was evacuated to a pressure of approximately 0.1 bar absolute.
3. The resin/hardener mixture or the resin was weighed out into an initial-charge vessel and injected into the vacuum dissolver via a flexible tube with tube clamp.
4. The mixture in the vacuum dissolver was dispersed for 5 minutes.
5. Where appropriate, any further hardener and/or resin components were injected.
6. After the dissolver drive had been switched off, a waiting time of at least 2 minutes was observed and then the dissolver was exposed to atmosphere.
7. The resin/hardener/filler mixture was removed and injected into an evacuated, closed sheet mould for the formation of a sheet having a thickness of 4 mm.
8. Curing (with supply of heat where appropriate)
9. Demoulding
10. Heat treatment of the test sheet (12 h at 80° C.). The samples were sawn to size and investigated.

In the experiments the resin without addition of filler was identified as sheet 1. Sheet 2 is the resin with addition of 20% of Blanc Fixe Brillant®, from Solvay Barium Strontium GmbH. Brillant has an average particle size of approximately 0.8 μm. This filler was dispersed directly into the resin. Sheet 3 is a resin in which 20% by weight of ultrafine barium sulphate was dispersed directly in the resin, without addition of a dispersant. This barium sulphate had an average particle size of 0.15 μm.

Sheet 4 contains the resin with 20% by weight of ultrafine barium sulphate which had been chemically dispersed; its preparation is described in Example 1.2 and its further processing to the premix in Example 2. This means that this barium sulphate, with a particle size in the range from 10 to 30 nm (primary particles), had been dispersed beforehand in the hardener. The mixture of dispersed barium sulphate and hardener was then incorporated as described above in the epoxy resin by mixing in the vacuum dissolver.

The test sheets were then subjected to the following investigations:

1. Tensile Test in Accordance with DIN EN ISO 527

The test was carried out on dumb bells having a nominal cross-section of 10×4 mm². The parallel length was 60 mm.

The test took place under the boundary conditions of Table 1:

TABLE 1

Test parameters, tensile test

| Parameter | Unit | Value |
| --- | --- | --- |
| Ambient temperature | ° C. | 23 |
| Relative ambient humidity | % | 50 |
| Testing speed | mm/min | 1.0 |
| Reference length of fine extensometer | mm | 50 |
| Lower reference extension for determination of elasticity modulus | % | 0.05 |
| Upper reference extension for determination of elasticity modulus | % | 0.25 |
| Method of calculation of elasticity modulus | — | regression |

TABLE 2

Test results, tensile test

| Material | Sheet No. | Tensile elasticity modulus MPa | Tensile strength MPa | Breaking extension % |
| --- | --- | --- | --- | --- |
| EPILOX M730/M880 | 1 | 3391 | 71.77 | 3.6 |
| EPILOX M730/M888 + 20% Brillant | 2 | 3427 | 58.52 | 1.85 |
| EPILOX M730/M888 with 20% BaSO$_4$ (1870/V71a-ZTS) dispersed mechanically | 3 | 3811 | 62.45 | 1.85 |
| EPILOX M730/M888 with 20% BaSO$_4$ (1870/V71a-ZTS) dispersed chemically | 4 | 3133 | 63.58 | 8.62 |

2. Flexural Test in Accordance with DIN EN ISO 178

The test was carried out on flat rods having a nominal cross-section of 15×4 mm².

The test took place under the boundary conditions of Table 3.

TABLE 3

Test parameters, tensile test

| Parameter | Unit | Value |
|---|---|---|
| Ambient temperature | °C. | 23 |
| Relative ambient humidity | % | 50 |
| Testing speed | mm/min | 2.0 |
| Support width | mm | 64 |

TABLE 4

Test results, flexural test

| Material | Sheet No. | Flexural elasticity modulus MPa | Flexural strength MPa |
|---|---|---|---|
| EPILOX M730/M880 | 1 | 3211 | 144.18 |
| EPILOX M730/M888 + 20% Brillant | 2 | 3463 | 99.03 |
| EPILOX M730/M888 with 20% BaSO$_4$ (1870/V71a-ZTS) dispersed mechanically | 3 | 3865 | 105.51 |
| EPILOX M730/M888 with 20% BaSO$_4$ (1870/V71a-ZTS) dispersed chemically | 4 | 3090 | 99.81 |

The individual values are depicted in the appendix.

3. Flexural Impact Test in Accordance with EN ISO 179 (Charpy, Unnotched)

The flexural impact test was carried out in the wide-side and narrow-side directions of stress on a pendulum impact mechanism with a support width of 62 mm.

TABLE 5

Results of the wide-side flexural impact test

| Material | Sheet No. | Flexural impact strength narrow side kJ/m$^2$ | Flexural impact strength wide side kJ/m$^2$ | Flexural impact strength average kJ/m$^2$ |
|---|---|---|---|---|
| EPILOX M730/M880 | 1 | 63.95 | 43.71 | 53.83 |
| EPILOX M730/M888 + 20% Brillant | 2 | 16.53 | 15.27 | 15.90 |
| EPILOX M730/M888 with 20% BaSO$_4$ (1870/V71a-ZTS) dispersed mechanically | 3 | 15.75 | 13.07 | 14.41 |
| EPILOX M730/M888 with 20% BaSO$_4$ (1870/V71a-ZTS) dispersed chemically | 4 | 60.06 | 67.43 | 63.75 |

The experiments show that the resin filled with nanoscale barium sulphate exhibits better properties than the material filled with the coarser Brillant product. Particularly noteworthy is the high flexural impact strength of sheet 4 with nanoscale deagglomerated barium sulphate containing crystallization inhibitor and dispersant and dispersed in the hardener beforehand. Indeed, the flexural impact strength of this material is even greater than that of the unfilled resin.

The invention claimed is:

1. A cured epoxy resin comprising a deagglomerated barium sulphate dispersed within said cured epoxy resin, said deagglomerated barium sulfate comprising primary and secondary barium sulfate particles, a crystallization inhibitor, and a dispersant; wherein the primary particles have an average primary particle size of <0.5 μm, wherein the dispersant sterically prevents reagglomeration of the primary and secondary barium sulphate particles and comprises groups which are able to interact with the surface of the primary and secondary barium sulphate particles, the dispersant being substituted by polar groups which endow the primary and secondary barium sulphate particles with a hydrophilicized surface, which permit the coupling of the primary and secondary barium sulphate particles to or into the epoxide and, accompanying the coupling, a further deagglomeration.

2. The cured epoxy resin according to claim 1, wherein the deagglomerated barium sulphate is present in an amount of 0.1 to 50% by weight of the cured epoxy resin.

3. The cured epoxy resin according to claim 1, wherein the primary barium sulphate particles have an average primary particle size of from 0.01 μm to less than 0.5 μm.

4. The cured epoxy resin according to claim 1, wherein 90% of the secondary barium sulphate particles are smaller than 2 μm.

5. The cured epoxy resin according to claim 1, wherein the deagglomerated barium sulphate is dispersed in a hardener, a polyol and/or in the epoxy resin prior to curing.

6. The cured epoxy resin according to claim 5, wherein the hardener is a polyoxyalkylenamine or anhydride hardener.

7. The cured epoxy resin according to claim 1, wherein the dispersant is a polyether carboxylate which is substituted by terminal hydroxyl groups on the ether groups.

8. The cured epoxy resin according to claim 1, wherein the crystallization inhibitor is citric acid or sodium polyacrylate.

9. A composite material comprising the cured epoxy resin according to claim 1.

10. The composite material according to claim 9, further comprising carbon fiber or glass fiber reinforcement.

11. A process for producing the cured epoxy resin according to claim 1, said process comprising: dispersing the deagglomerated barium sulphate in a precursor of the cured epoxy resin prior to curing; and curing the epoxy resin.

12. The cured epoxy resin according to claim 1, wherein the primary barium sulphate particles have an average primary particle size of <0.1 μm.

13. The cured epoxy resin according to claim 1, wherein 90% of the secondary barium sulphate particles are smaller than 250 nm.

14. The cured epoxy resin according to claim 1, obtained by dispersing the deagglomerated barium sulphate in a precursor of the cured epoxy resin prior to curing.

15. A composition comprising a precursor of a cured epoxy resin and a deagglomerated barium sulphate, said deagglomerated barium sulfate comprising primary and secondary barium sulfate particles, a crystallization inhibitor, and a dispersant; wherein the primary particles have an average primary particle size of <0.5 μm, wherein the dispersant sterically prevents reagglomeration of the primary and secondary barium sulphate particles and comprises groups which are able to interact with the surface of the primary and secondary barium sulphate particles, the dispersant being substituted by polar groups which endow the primary and secondary barium sulphate particles with a hydrophilicized surface, which permit the coupling of the primary and secondary barium sulphate particles to or into the epoxide and, accompanying the coupling, a further deagglomeration.

16. The composition according to claim 15, wherein the deagglomerated barium sulphate is present in an amount of 0.1 to 50% by weight, based on the total weight of the composition.

17. The composition according to claim 15, wherein the dispersant is a polyether carboxylate which is substituted by terminal hydroxyl groups on the ether groups.

18. A composition comprising uncured epoxy resin and a deagglomerated barium sulphate, said deagglomerated barium sulfate comprising primary and secondary barium sulfate particles, a crystallization inhibitor, and a dispersant; wherein the primary particles have an average primary particle size of <0.5 µm, wherein the dispersant sterically prevents reagglomeration of the primary and secondary barium sulphate particles and comprises groups which are able to interact with the surface of the primary and secondary barium sulphate particles, the dispersant being substituted by polar groups which endow the primary and secondary barium sulphate particles with a hydrophilicized surface, which permit the coupling of the primary and secondary barium sulphate particles to or into the epoxide and, accompanying the coupling, a further deagglomeration.

19. The composition according to claim 18, wherein the deagglomerated barium sulphate is present in an amount of 0.1 to 50% by weight, based on the total weight of the composition.

20. The composition according to claim 18, wherein the dispersant is a polyether carboxylate which is substituted by terminal hydroxyl groups on the ether groups.

* * * * *